May 9, 1950  E. E. BARKSTROM ET AL  2,507,294
GRANULAR MATERIAL FEEDING AND SPREADING APPARATUS
Filed Jan. 8, 1947  3 Sheets-Sheet 1

INVENTORS
E. E. BARKSTROM
J. GURSKIS JR.
BY E. F. Kane
ATTORNEY

May 9, 1950  E. E. BARKSTROM ET AL  2,507,294
GRANULAR MATERIAL FEEDING AND SPREADING APPARATUS
Filed Jan. 8, 1947  3 Sheets-Sheet 2

INVENTORS
E. E. BARKSTROM
J. GURSKIS JR.
BY E. F. Kane
ATTORNEY

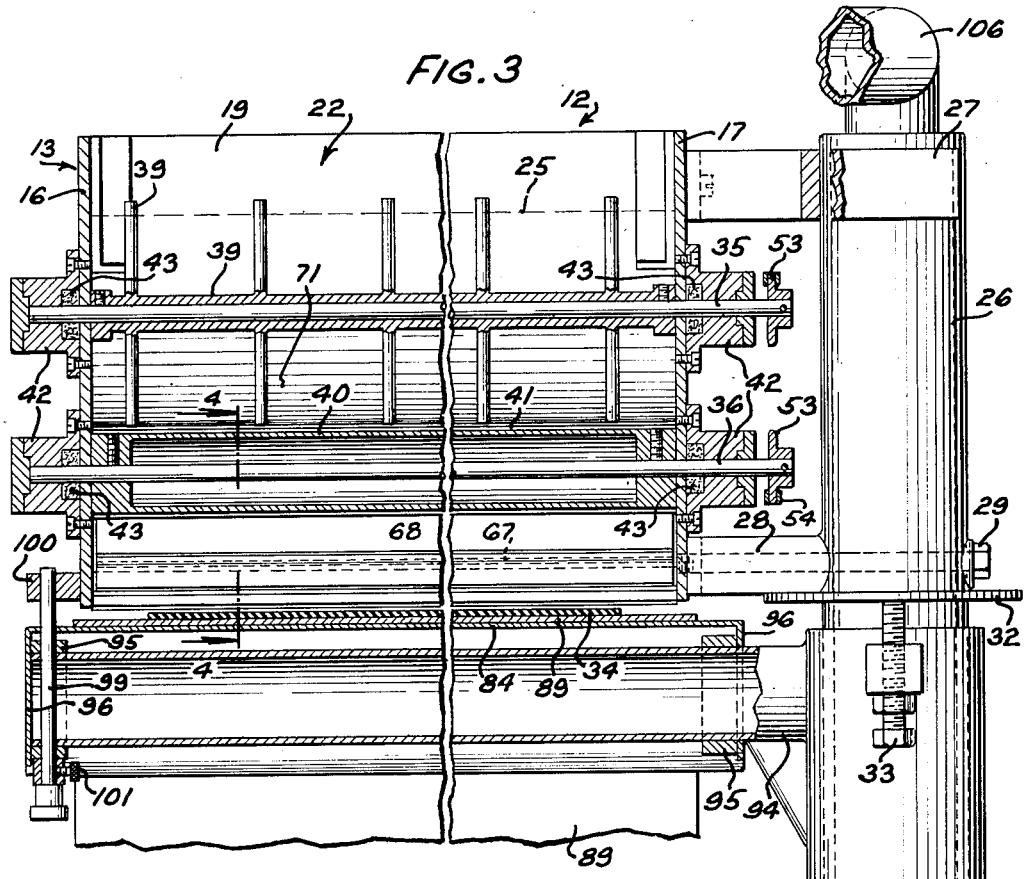
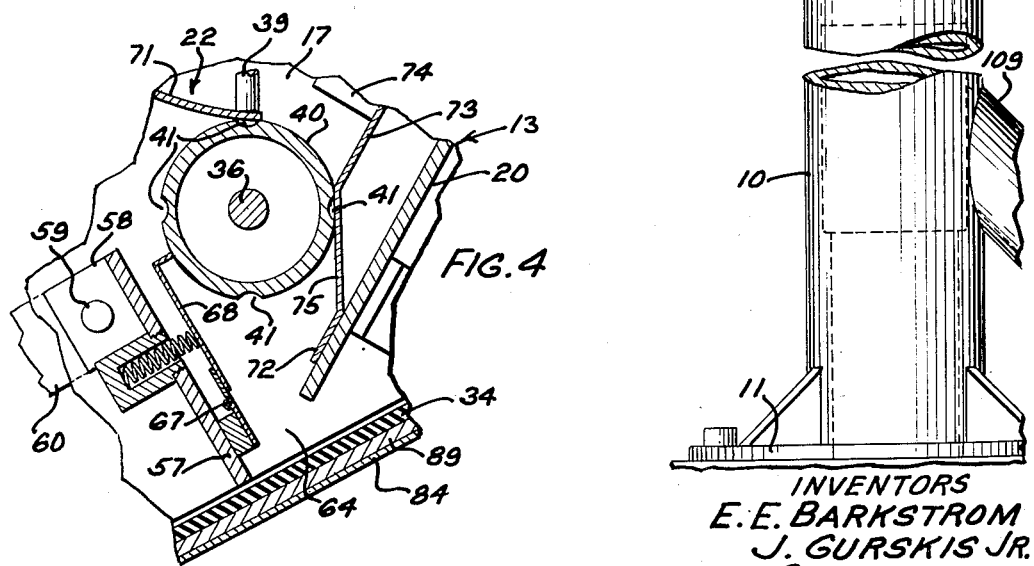

Patented May 9, 1950

2,507,294

UNITED STATES PATENT OFFICE 2,507,294

GRANULAR MATERIAL FEEDING AND SPREADING APPARATUS

Elmer E. Barkstrom and Joseph Gurskis, Jr., Chicago, Ill., assignors to Western Electric Company, Incorporated, New York, N. Y., a corporation of New York Application January 8, 1947, Serial No. 720,778

9 Claims. (Cl. 91—25)

1

This invention relates to granular material feeding and spreading apparatus and more particularly to an apparatus for feeding and spreading talc on a strip of rubber as it travels on a conveyor from a rubber mill to a capstan or take-up spool to prevent successive layers of the rubber from adhering to each other.

An object of the present invention is the provision of a simple, practicable and efficient apparatus for feeding and spreading granular material evenly on a strip.

In accordance with the above object, the present invention, in one embodiment thereof, as applied to the feeding and spreading of talc onto a strip of rubber travelling with a conveyor belt from a rubber mill to a take-up spool, comprises a hopper arranged above the conveyor belt and provided with a motor driven agitator and a feeding drum at the exit opening of the hopper, whereby a measured amount of talc may be fed intermittently onto the rubber strip as it travels with the conveyor belt to the take-up spool and a motor-driven brush for spreading the talc evenly over the strip before it is wound on the take-up spool. The hopper is pivotally supported on a hollow pedestal for movement into and out of association with the conveyor belt, the interior of the pedestal being in communication with a suction head disposed adjacent the upper surface of the rubber strip to carry off the excess talc from the strip through the pedestal.

Other objects and advantages of this invention will more fully appear from the following detailed description, taken in conjunction with the accompanying drawings, in which Fig. 1 is a fragmentary plan view of a material feeding and spreading apparatus embodying the features of the invention;

Fig. 3 is an enlarged fragmentary vertical longitudinal section, partly in elevation, taken on the line 3—3 of Fig. 1; and Fig. 4 is an enlarged fragmentary detail vertical section taken on the line 4—4 of Fig. 3.

Figure 2:
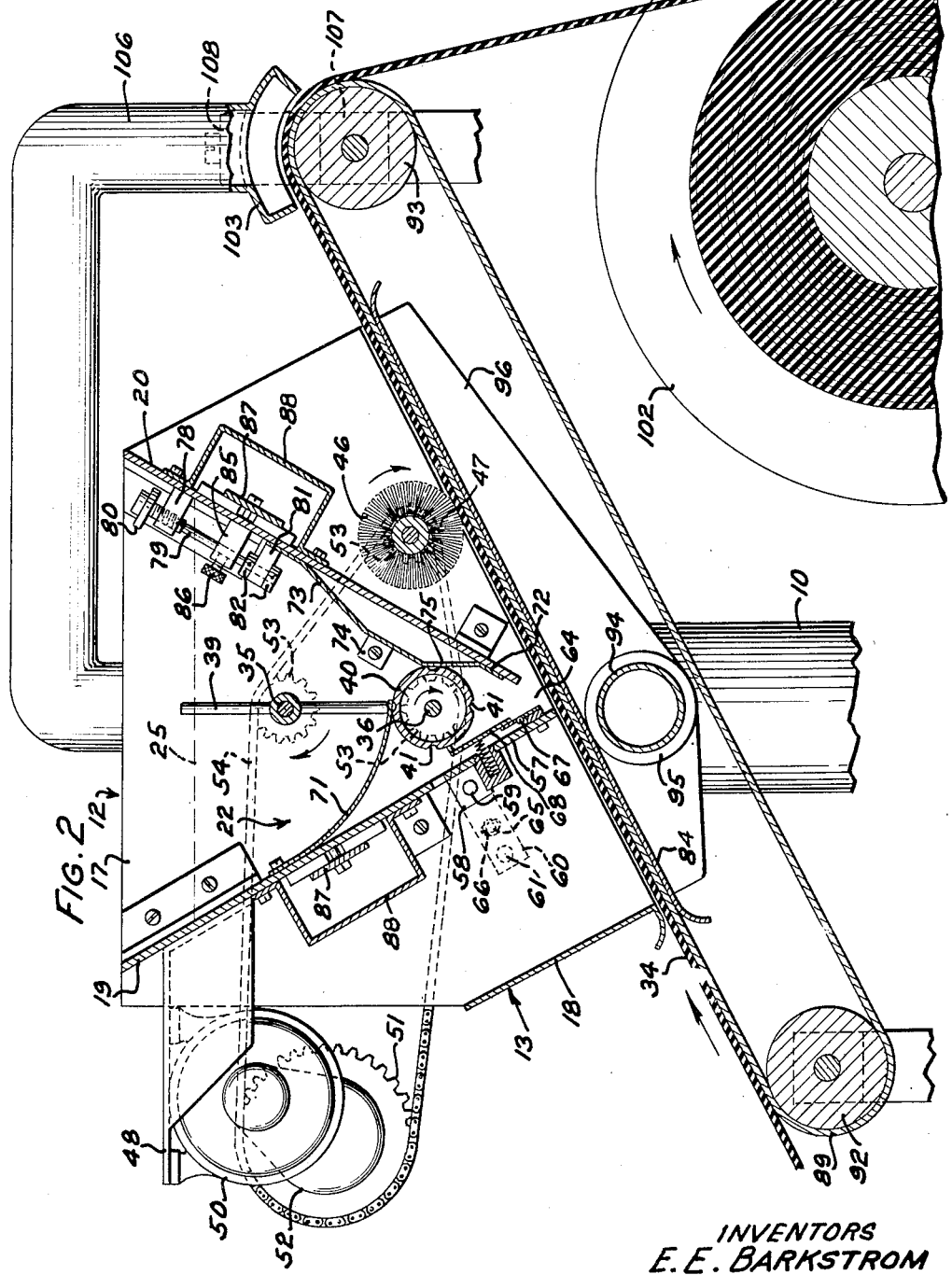
Fig. 2 is an enlarged fragmentary vertical section taken on the line 2—2 of Fig. 1.

Referring to the drawings in detail, and particularly to Figs. 2 and 3, a tubular pedestal is indicated at 10 provided with a base 11 for supporting the apparatus. Pivotally supported for horizontal movement about the vertical axis of the pedestal 10 is a talc feeding and spreading mechanism, indicated in general at 12. The mechanism 12 includes a framework 13 comprising opposite irregularly shaped end walls 16 and 17, which are tied together at one side by a

2 partial side wall 18, the rest of the framework being open along its sides, top and bottom. Extending between and attached to the end walls 16 and 17 are oppositely inclined walls 19 and 20 forming, in the main, with the framework end walls 16 and 17, a hopper 22 for holding a supply of talc, the level of which in the hopper being indicated by the broken line 25. It will be apparent that the hopper walls 19 and 20, together with the framework side wall 18, serve to tie the framework end walls 16 and 17 firmly together.

The means for pivotally supporting the mechanism 12 upon the tubular pedestal 10 comprises a tubular member 26 having its peripheral surface fitted to freely rotate upon the inner peripheral surface of the pedestal. Welded to the member 26 at its upper end is a horizontal bracket 27 having two arms thereof bolted to the framework end wall 17 (Fig. 1) and integral with the member 26 intermediate its ends and aligned with the bracket 27 is a horizontal tubular arm 28, to the outer end face of which is attached the framework end wall 17 by means of a bolt 29, which extends through the tubular member 26 and the arm 28 thereon and is threaded into the end wall 17. A circular flange 32 on the tubular member 26 immediately below the arm 28 and which rests upon a vertically adjustable screw 33 carried on the pedestal 10, serves to support the member 26 supporting the material feeding and spreading mechanism 12 at a desired elevation relative to a travelling strip of rubber 34, to which talc from the hopper 22 is to be applied in the operation of the mechanism. The means for supporting and moving the strip of rubber 34 along an inclined plane, as shown in Fig. 2, will be presently described. From the above description, it will be apparent that the mechanism 12 may be rotated as a unit about the vertical axis of the pedestal 10 into and out of operative relation with the inclined path of the strip of rubber 34 as desired. This arrangement is provided since, at times, it is desirable to take up the strip of rubber 34 or other strip material without delivering talc thereto.

Mounted within the hopper 22 and attached to horizontal shafts 35 and 36 extending through the framework end walls 16 and 17 is a multi-bladed agitator 39 and a hollow feed drum 40, respectively, arranged in vertical alignment. The feed drum 40 is provided with a plurality of equally spaced longitudinally extending peripheral grooves 41, the purpose of which will be made apparent hereinafter, and the end surfaces of the agitator 39 and drum 40 snugly bear upon the opposed inner surfaces of the framework end walls 16 and 17. The shafts 35 and 36 are similarly journalled at their opposite ends in bearing boxes 42 attached to the outer surfaces of the end walls 16 and 17 and provided with suitable means, indicated at 43 (Fig. 3), carried in the boxes and surrounding the shafts to provide seals to prevent the talc in the hopper 22 from passing along the shafts into the bearing boxes.

Also mounted within the hopper 22 at the right side of the shafts 35 and 36 (Fig. 2), in a manner similar to that described for the agitator 39 and feed drum 40, is a rotary brush 46 provided with soft bristles fixed to a shaft 47. The brush 46 serves to evenly spread the talc dropped intermittently from the grooves 41 of the feed drum 40 onto the moving strip of rubber 34 so that after the strip of rubber advances from the brush, it has a layer of talc spread evenly thereover. The agitator 39, feed drum 40 and brush 46, in the operation of the mechanism, are each simultaneously driven in a clockwise direction and at substantially the same speed by the following driving mechanism. Depending from a bracket 48 attached to the framework end wall 16 is a suitable type of electric motor 50, the shaft of which is operatively connected to a sprocket wheel 51 through a gear reduction unit 52 mounted on the motor and driven from its shaft. Each of the shafts 35, 36 and 47 has fixed thereto a sprocket pinion 53, driven from the sprocket wheel 51 by an endless sprocket chain 54 associated with the sprocket wheel 51, as clearly shown in Fig. 2.

Associated with and extending along the entire length of the inclined hopper wall 19 is a pivotally adjustable hopper wall 57, which has an angular extension 58 at each end, which is pivoted by means of an attached rod 59 to the framework walls 16 and 17. One of the rods 59 extends beyond the outer surface of the framework end wall 17 and secured to such rod is a lever 60 (Figs. 2 and 4) carrying a hand grip 61, whereby the adjustable hopper wall 57 shown in a plane coinciding with that of the hopper wall 19 in Fig. 2 may be rocked in either direction to enlarge or narrow the outlet space indicated at 64 of the hopper 22 provided at the lower ends of the spaced walls 20 and 57. When suitably adjusted, the hopper wall 57 is retained in position by tightening a clamping bolt 65 fixed to the end wall 17 and extending into a slot 66 provided in the lever 60. Hinged to the adjustable hopper wall 57 at 67 is a spring-pressed scraper blade 68 (Fig. 4), which, at its upper end, is arranged to constantly bear against the peripheral surface of the feed drum 40 along its entire length and, in the operation of the mechanism, rides into and out of the longitudinal grooves 41 and is effective to remove from the grooves and the peripheral surface of the feed drum any talc which does not drop therefrom through the outlet space 64 onto the moving strip of rubber 34.

Attached at its upper end portion to the hopper wall 19 and extending along its entire length is an arc-shaped spring plate 71 having its lower end portion constantly bearing at its lower surface upon the periphery of the feed drum 40 under a suitable pressure. The plate 71 serves to seal off the left hand side of the hopper 22 from the hopper outlet space 64. Slidable along its opposite side portions upon the hopper wall 20 and extending along its entire length is a spring plate 72 having a portion 73 thereof intermediate the side portions, which is raised out of the plane of the wall 20. The portion 73 bears under suitable pressure against fixed slide plates 74 attached to the framework end walls 16 and 17. A portion 75 of the plate 72, as shown in the drawings, when the mechanism is set up for delivering talc from the hopper 22 to the strip of rubber solely by means of the grooves 41 of the feed drum 40, bears against the periphery of the feed drum and this serves to limit the amount of talc delivered during each complete rotation of the feed drum to the amount of talc carried in the grooves 41, the talc being intermittently dropped onto the moving strip of rubber 34. When it is desired to feed a greater amount of talc to the strip of rubber 34, the plate 72 is moved upwardly upon the hopper wall 20 to move the portion 75 of the plate from engagement with the periphery of the feed drum 40 and thus providing a space therebetween with the result that a continuous feed of the talc will be delivered to the strip of rubber 34. In order to slide the plate 72 upwardly or downwardly to vary the amount of talc delivered from the hopper 22, the following mechanism is provided.

Fixed to the hopper wall 20 is an apertured screw-threaded bearing block 78, through which extends one end of a screw-threaded rod 79 equipped with a hand grip 80 for rotating it, the opposite end of the rod being freely rotatable in a bearing block 81 attached to the plate 72. Pinned to the rod 79 at opposite sides of the block 81 are collars 82. Secured to the hopper wall 20, between the bearing blocks 78 and 81, is a block 85, through which the rod 79 freely extends, the block carrying a clamping screw 86, whereby, after an adjustment of the plate 72 by a rotation of the rod 79, it may be retained in its adjusted position.

For the purpose of maintaining the talc in the hopper 22 dry and thus freely flowing during its feed to the moving strip of rubber 34, the opposite inclined walls 19 and 20 of the hopper 22 are equipped with suitable electrical resistance heaters 87, which serve to heat the walls and, in turn, the talc, the heaters being enclosed in housings 88.

Arranged below the hopper 22 is an inclined table 84 for supporting an endless power driven conveyor belt 89 trained around rollers 92 and 93, the upper length of the belt travelling in the direction of the arrow (Fig. 2). The roller 92 may be driven at a suitable speed in a clockwise direction to drive the belt 89 by any suitable means and such means is not shown, since it is not believed necessary for a complete understanding of this invention. For supporting the table 84, the pedestal 10 carries a tubular horizontal arm 94 for receiving rings 95 attached to opposite depending side walls 96 of the table, which is clamped in the proper inclined position by means of set screws (not shown) carried by the rings and clamped against the arm. For the purpose of retaining the pivotally mounted talc feeding and spreading mechanism 12 in its operative position relative to the table 84, as shown in the drawings, a locking pin 99 extends through aligned apertures in the outer left-hand ring 95 (Fig. 3), the arm 94 and the table 84 and into an apertured lug 100 fixed to the framework end wall 16. A set screw 101 holds the pin 99 in its retaining position.

Arranged below the roller 93 is a capstan or takeup spool 102, which receives the strip of rubber 34 after talc has been applied thereto.

The capstan 102, in the operation of the mechanism, is driven at a constantly decreasing speed as the diameter of the rubber strip wound upon the capstan increases in order to take up the rubber strip at a constant rate. Since the means for driving the capstan 102 forms no part of the invention, and it is well known in the art of reeling, it has been omitted from the drawings, since it is not necessary to a complete understanding of this invention.

Figure 1:
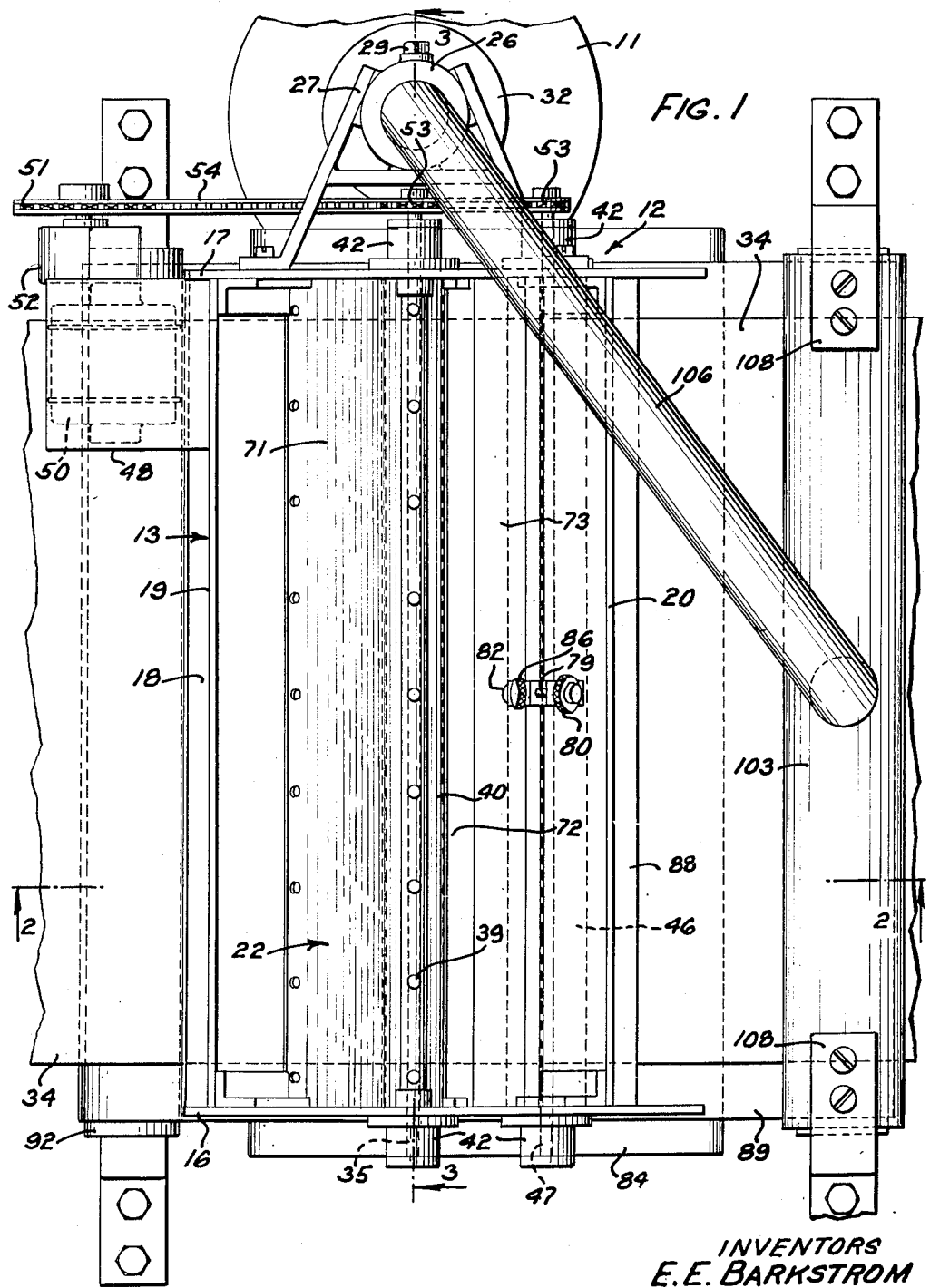

In order to remove any excess of talc from the strip of rubber 34 during its advance from the mechanism 12, there is provided a fixed air suction head 103, which is arranged directly above the roller 93 and suitably spaced from the strip of rubber 34 (Figs. 1 and 3). The head 103 communicates, by means of a pipe 106, with the tubular member 26, which pivotally supports the mechanism 12 upon the tubular pedestal 10. Extending from bearing and supporting means, indicated at 107 (Fig. 2), for each end of the roller 93 are brackets 108, to which the suction head 103 is attached. The end of the pipe 106 communicating with the tubular member 26 is closely fitted therein to provide a tight connection and at the same time permit the tubular member 26 to turn thereon when the mechanism is rotated from its operative position on the tubular pedestal 10, as shown in the drawings in the manner previously referred to. Adjacent its lower end, the tubular pedestal 10 communicates with a vacuum pump unit (not shown) by means of a pipe 109. Thus, an excess of talc delivered, for any reason, to the advancing strip of rubber 34 will be sucked up therefrom by the air suction head 103 and delivered through the pipe 106, member 26, pedestal 10 and pipe 109 to a container (not shown) associated with the vacuum pump unit.

In the operation of the mechanism above described, the strip of rubber 34 is led from the rubber mill onto the moving conveyor belt 89 and, with the mechanism 12 in operation, the agitator 39, feed wheel 40 and brush 46 will be effective to feed and spread an even layer of talc from the hopper 22 through the adjustable outlet space 64 onto the advancing strip of rubber. Thereafter, as the strip of rubber 34 advances around the roller 93, the air suction head 103 draws from the strip of rubber any excess of talc deposited thereon and, with the advancing end of the strip of rubber attached to the capstan or takeup spool 103, the talc-coated strip will be wound up without successive layers adhering to each other.

What is claimed is:

1. An apparatus for feeding granular material onto an advancing strip comprising means for supporting and advancing a strip, a hopper for material having an outlet adapted to direct material therefrom onto the advancing strip, a rotatable material conveying means in said hopper adapted to convey material in the rotation thereof and deposit the same into said outlet, spring plates carried by walls of the hopper and yieldably bearing upon spaced peripheral portions of said conveying means and cooperating therewith to close said hopper outlet from that portion of the hopper containing the material, and means for rotating said conveying means.

2. An apparatus for intermittently feeding and subsequently evenly spreading powdered material onto an advancing strip comprising means for supporting and advancing a strip, a hopper for powdered material having an outlet adapted to direct material therefrom onto the advancing strip, rotatable material conveying means in said hopper for intermittently depositing material from said hopper into said outlet, spring plates carried by walls of the hopper and yieldably bearing upon spaced peripheral portions of said conveying means and cooperating therewith to close said hopper outlet from that portion of the hopper containing the material, a rotary brush effective after the material has been deposited on the strip to spread the material evenly thereon, means for rotating said rotatable material conveying means, and means for rotating said brush.

3. An apparatus for feeding powdered material onto an advancing strip comprising means for supporting and advancing a strip, a pedestal arranged transversely of the path of the strip, a hopper for powdered material, means for pivotally supporting said hopper about a vertical axis on said pedestal above the plane of said strip for movement into association with said strip, said hopper having an outlet adapted in one position of the hopper to direct material therefrom onto the advancing strip, means for maintaining said hopper in said one position, rotatable material conveying means in said hopper for intermittently depositing material from said hopper into said outlet, and means for rotating said rotatable material conveying means.

4. An apparatus for feeding powdered material onto an advancing strip comprising means for supporting and advancing a strip, a hopper including opposed inclined walls for powdered material having an outlet therebetween adapted to direct material therefrom across substantially the entire width of the advancing strip, a rotatable feed drum in said hopper provided with longitudinally extending peripheral grooves adapted to pick up material in the rotation thereof and deposit the same into said outlet, plates carried by said hopper walls and bearing upon spaced peripheral portions of said drum and cooperating therewith to close said hopper outlet from that portion of the hopper containing the material, one of said hopper walls having a pivotally adjustable portion for varying the size of said outlet, and means for rotating said drum.

5. An apparatus for intermittently feeding material onto an advancing strip comprising means for supporting and advancing a strip, a hopper for material having an outlet adapted to direct material therefrom onto the advancing strip, a rotatable feed drum in said hopper above said outlet provided with longitudinally extending peripheral grooves adapted to pick up material in the rotation of the drum and deposit the same into said outlet, spring plates supported by opposed hopper walls and normally yieldably bearing upon spaced peripheral portions of said drum and cooperating therewith to close said hopper outlet from that portion of the hopper containing the material, an actuator for moving one of said plates upon its supporting wall to withdraw it from said drum to directly open said hopper to said outlet, and means for rotating said drum.

6. An apparatus for feeding material onto an advancing strip comprising means for supporting and advancing a strip, a hopper for material having an outlet adapted to direct material therefrom onto the advancing strip, a rotatable material conveying means in said hopper adapted to convey material in the rotation thereof and deposit the same into said outlet, plates supported by opposed hopper walls and bearing upon spaced peripheral portions of said conveying means and cooperating therewith to close said hopper outlet from that portion of the hopper containing the material, an actuator for moving one of said plates upon its supporting wall to withdraw it from said conveying means to directly open said hopper to said outlet, one of said hopper walls having a pivotally adjustable portion for varying the size of said outlet, and means for rotating said conveying means.

7. An apparatus for intermittently feeding and subsequently evenly spreading powdered material onto an advancing strip comprising means for supporting and advancing a strip, a hollow pedestal arranged transversely of the path of the strip, a hopper for powdered material, means including a hollow member rotatably fitted into the hollow of said pedestal for pivotally supporting said hopper about a vertical axis on said pedestal above the plane of said strip for movement into association with said strip, said hopper having an outlet adapted in one position of the hopper to direct material therefrom onto the advancing strip, means for maintaining said hopper in said one position, material conveying means in said hopper for intermittently depositing material from said hopper into said outlet, a rotary brush effective after the material has been deposited on the strip to spread the material evenly thereon, an air suction head in effective association with the strip for removing therefrom an excess of the spread material, a conduit rotatably fitted into said hollow member at one end and communicating at its opposite end with said suction head, a suction conduit communicating with the hollow pedestal, means for rotating said material conveying means, and means for rotating said brush.

8. In an apparatus for distributing powdered material over a surface of a web, a hopper having an outlet disposed adjacent to said web, means for imparting movement to the web relative to said outlet, and a plurality of cooperating members defining a discharge passage to feed material to the outlet of the hopper, one of said members being rotatably mounted and the other said members being spring plates normally yieldably bearing upon said one member, one of said spring plates being slidable to adjust its position with respect to said one member for varying the size of said passage.

9. In an apparatus for distributing powdered material over a surface of a web, a hopper having an outlet disposed adjacent to said web, means for imparting movement to the web relative to said outlet, a tubular standard for oscillatably supporting said hopper for movement about a vertical axis into association with said web, suction means communicating with said standard, and a suction head disposed adjacent the web to remove excess material from it and said head being connected to the suction means through said standard.

ELMER E. BARKSTROM.
JOSEPH GURSKIS, Jr.

REFERENCES CITED

The following references are of record in the file of this patent:

UNITED STATES PATENTS

| Number | Name | Date |
|---|---|---|
| 166,829 | Wagner | Aug. 17, 1875 |
| 739,267 | Pohlmann | Sept. 15, 1903 |
| 829,074 | Kramer | Aug. 21, 1906 |
| 858,508 | Goldman | July 2, 1907 |
| 1,718,419 | Hollingsworth | June 25, 1929 |
| 1,772,907 | Macan et al. | Aug. 12, 1930 |
| 1,880,065 | Arpin | Sept. 27, 1932 |